Dec. 16, 1930.  H. F. FLOWERS  1,785,678
DUMP VEHICLE WITH ACTUATED DOORS
Original Filed April 8, 1926  2 Sheets-Sheet 1
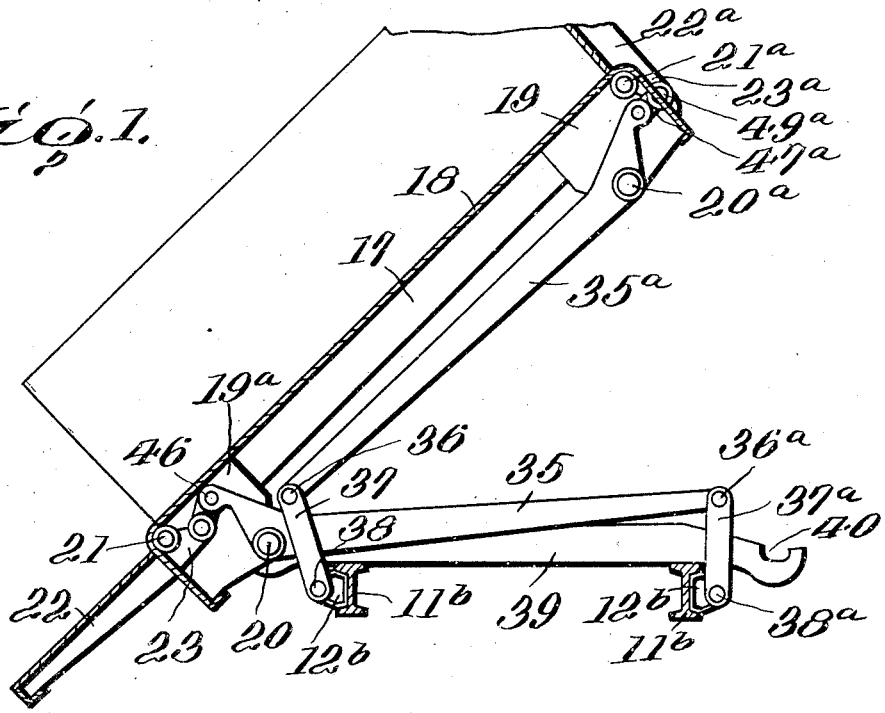
Inventor
Henry Fort Flowers,
By Sturtevant & Mason,
Attorneys.

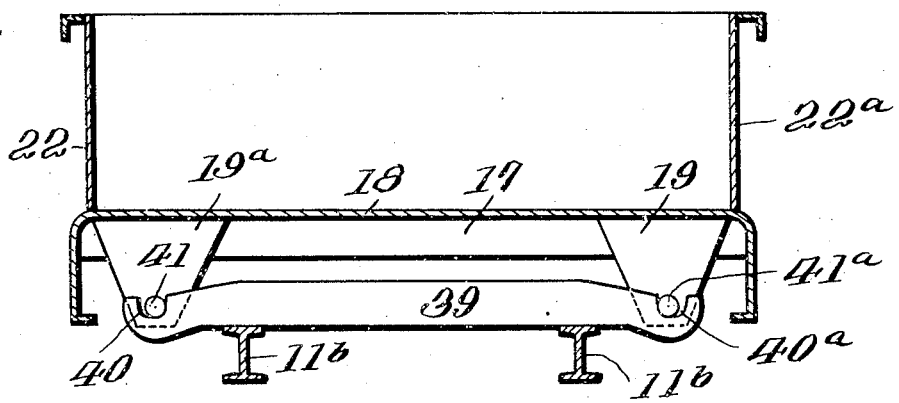
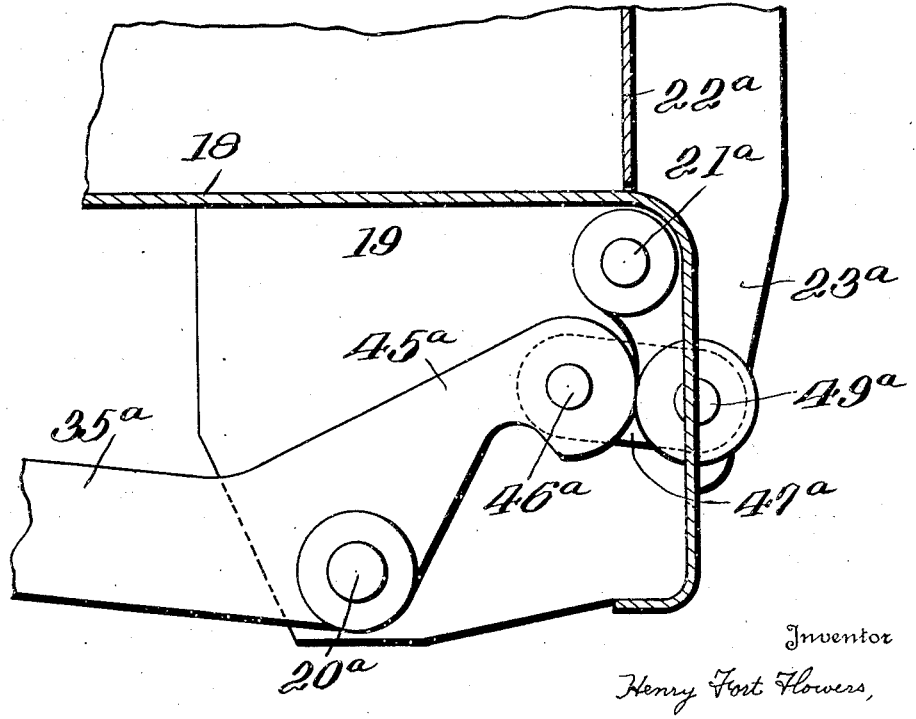

Patented Dec. 16, 1930

1,785,678

UNITED STATES PATENT OFFICE

HENRY FORT FLOWERS, OF FINDLAY, OHIO

DUMP VEHICLE WITH ACTUATED DOORS

Original application filed April 8, 1926, Serial No. 100,577. Divided and this application filed May 25, 1928.
Serial No. 280,505.

This invention relates to improvements in door controlling mechanisms for dump vehicles, and is particularly adapted to such vehicles which dump selectively to either side.

The present application is a division of my copending application Serial No. 100,577 filed on April 8, 1926, and likewise relates to vehicles in which the doors are positively actuated during the return movement of the body from tilted to a normal transport position, so that the respective door is positively closed. Furthermore, means are provided for holding both doors in closed position during this normal transport, and to hold the door at the upper side of the body closed while the body is tilting and returning from tilted position.

According to the present invention, such a door actuating and holding system is illustrated as having transverse bars to cooperate with members on the doors. The doors are held closed while the body is in normal transport position; and the door at the upper side of the body is held closed while the body is tilted for dumping; and the door at the lower side or that adjacent the fulcrum selected for tilting, is released and permitted to open by gravity during the tilting of the body, and is limited in its movement as determined by the construction of the apparatus and the rate of movement of the body into tilted position; and during the return of the body from tilted position this door is selectively closed. In particular, these effects are produced by the cooperation of members on the frame and body.

Another feature of the present invention is the provision of a door controlling system permitting a lateral movement of the body during tilting without effect upon the operation of the door controlling mechanism, whereby the system is not limited to dump bodies which rock or tilt about a fixed pivot or fulcrum.

Still another feature is the provision of door controlling mechanisms having a locking member for each door which is pivoted to the body and coupled to the frame and to the respective door by link connections.

A further feature of the invention is the provision of a door controlling mechanism by which the doors are closed positively during the return of the dump body from the tilted position, as set forth above, and in which the door controlling mechanism has a cam and link connection whereby the link may close the door, and then the cam is brought into engagement with the door at or toward the end of the closing movement to positively hold the door closed while the body is in normal transport position.

With these and other objects in view, as will appear in the course of the following specification, the invention has been set forth illustratively on the accompanying drawings, in which:

Figure 1 is a section through a constructional form of the invention, showing the vehicle with the body in the tilted position.

Fig. 2 is a section similar to Fig. 1, with the body in the normal transport position.

Fig. 3 is a section through a vehicle showing a type of body support which may be employed with the invention.

Fig. 4 is a section similar to that of Fig. 2, but on a larger scale, and showing a locking or holding system for supporting the doors while the body is in the normal transport position.

In these drawings, the dump body is represented as having the supporting irons 17 with the floor or bottom plate 18 fastened rigidly thereto. The gusset plates 19, 19a are rigidly secured to the irons 17 and project downwardly from the floor plate 18, and at the bottom ends carry the pivots 20, 20a which are connected to transverse bars, as will be described hereinafter. At each side the body is provided with pivots 21, 21a for the respective doors 22, 22a, having the downwardly extending arms 23, 23a.

The underframe of the vehicle comprises the longitudinal members 11b and the projecting brackets 12b which carry the pivots 38, 38a for the links 37, 37a, which at their upper ends are respectively connected by the pivots 36, 36a to the transverse arms or bars 35, 35a referred to above.

The frame members 11b carry separate transverse members 39 which extend across the frame, and have the channels 40, 40a adjacent their ends to receive the trunnions or fulcrums 41, 41a which project from the gusset plates 19, 19a of the frame. As the body is tilted the trunnions or fulcrums 41, 41a roll upon the bottom of the channels toward the respective side, so that the dump body is tilted about a moving pivot. This motion of the pivot is compensated by the permitted rocking of the respective link 37, 37a. It will likewise be understood that as the body tilts into the position shown in Fig. 1, in moving from the normal transport position, the respective link 37, 37a will likewise rock about its pivot 38, 38a and cause the link 35a, 35 to make a slight movement about the pivot point 20, 20a. This movement, however, is so slight that there is no substantial effect upon the door 22a or 22 as the case may be.

The transverse bars 35, 35a are provided at the outer ends with projecting arms 45, 45a which carry the pivots 46, 46a for the small links 47, 47a which at their other ends are connected to the depending fingers 48, 48a on the doors 22, 22a by means of the pivots 49, 49a.

The method of operation of this device is as follows:

While the body is in the position of normal transport, as shown in Fig. 2, a load may be placed upon the floor plate 18 and the vehicle moved to any suitable point for discharge. During this transport the doors are locked in closed position by the engagement of the end of the respective arms 35, 35a, and associated parts, with the depending portions 48, 48a of the respective doors; and this position is maintained by the weight of the body itself upon the several connected members; and the body itself rests in stable equilibrium upon the two fulcrums which are separated from the center longitudinal line of the vehicle, so that during the tilting for dumping the center of gravity of the body is at all times between these fulcrums. By this means the body may return from normal tilted to normal transport position by gravity when the raising mechanism has been rendered inoperative. No specific type of raising mechanism has been indicated, and it will be understood that any type may be employed for accomplishing the tilting of the body to a respective and desired side.

Upon arriving at the point for discharge, one side of the body is raised with a tilting about the fulcrum or trunnion at the opposite side. This may be accomplished by the raising mechanism which may be of any desired type, such as, for example, the self-carried power unit as disclosed in my Patent No. 1,611,012, granted Dec. 14, 1926; my copending application Ser. No. 66,791, filed Nov. 4, 1925, or by means of a raising device located along the right-of-way, as set forth in my Patent No. 1,624,323, granted April 12, 1927; these several applications being copending with the parent application. Since such a raising device forms no part of the present invention, it need not be described in further detail than by reference to the aforesaid patents and applications.

As the body tilts, for example, about the fulcrum axis 20 at the left side in Figs. 1 and 2, the pivot 21 for the door at the left hand side is lowered with respect to the pivot point 20 of the dump body, and the pivot 46 at the left hand end of the arm 35 remains relatively stationary with respect to the body, so that the depending arm 48 of the door tends to move relatively downwardly and inwardly beneath the end 45 of the arm 35, and this relative movement releases the respective door 22 so that it may open by its own weight and by the weight of the load which successively comes thereagainst as the body tilts, finally passing into the position shown in Fig. 1, in which the door forms a guide chute for the material being discharged from the dump body.

The tilting movement of the body has caused the fulcrum pin 41 to roll in the bottom of the channel 40 with a relative sidewise movement of the body with respect to the frame. This movement is permitted by the arrangement of the link 37a, which may yield slightly before its side comes into contact with the longitudinal member 12b. It will further be noted that the lateral movement of the bar 35 is employed to assist in determining the timing and rate of opening and closing of the door being opened and closed. The door at the upper end of the body is maintained closed by the blocking of the end of the arm 45a against the other members and the depending portion 48a of the door, this slight lateral movement of the body being compensated by the rocking of the link 37, as shown in Fig. 1.

As the body tilts, the small link 47 or 47a operates to positively open the door, even if the gravitational weight of the door itself, or of the load thereagainst does not produce the opening.

The return of the body to the transport position occurs in a reverse manner, the ends of the transverse bars 35, 35a acting through the small links 47, 47a, respectively, to positively close the respective door 22, 22a which has been opened. Finally, the inward surface of the projecting finger or depending portion 48, 48a of the respective doors 22, 22a acts as a cam in cooperation with the similarly shaped end surface of the projecting arm 45, 45a at the closed position of the door, to block and lock the door closed when in the transport position of the vehicle, and likewise during the tilting of the body about the opposite fulcrum. It will be noted that the door is brought to a closed position in the normal course, and during the final movement of the dump body the outer end of the arm 45 or 45a is presented against the door to form a positive lock against any outward movement of the door during transport.

In the particular form illustrated, it will be understood that the pins 20, 41 and 20a, 41a are shown as integral and coaxial, so that the axes of the respective parts are in alinement; but that this is illustrative only, and that other constructions may be employed, and that the invention may be otherwise modified within the scope of the appended claims.

What I claim as new and desire to secure by Letters Patent is:

1. In a dump vehicle, a frame, a dump body tiltable upon said frame for dumping to either side, side doors for said body, transverse bars extending across said frame and alternately pivoted thereto at opposite sides thereof, said bars being pivoted adjacent their free ends to said body, and positive means connecting said bars and said doors to limit the opening of said doors during the tilting of the body toward the respective side, said bars and said doors having cooperating cam surfaces in mutual abutting relation during normal transport to hold said doors closed during such normal transport.

2. In a dump vehicle, a frame, a dump body tiltable to either side for dumping about fulcrums at opposite sides of the frame, said body being supported in stable equilibrium upon said fulcrums during normal transport and having a limited lateral movement during tilting, side doors for said body, transverse bars extending across said frame, links to pivotally connect said bars alternately to opposite sides of said frame to permit a relative movement of a bar with respect to said frame during the tilting of said body, means connecting said bars and said doors to limit the opening of said doors during the tilting of said body about the fulcrum adjacent the respective door, and cooperating cam surfaces on said bars and said doors to hold said doors closed when said body is in normal transport position.

3. In a dump vehicle, a frame, a dump body tiltable about fulcrums at opposite sides of said frame, said dump body being supported in stable equilibrium on said fulcrums during normal transport, transverse bars pivotally connected at one end to said frame alternately at opposite sides thereof and having a cam at the other end, pivot connections between said body and the cam ends of said bars, side doors for said dump body pivoted thereto, said doors having cams formed thereon to cooperate with adjacent cams on said respective bars, and a link connection between the respective doors and respective bars.

4. In a dumping vehicle, a frame, a dump body tiltable about fulcrums at opposite sides of said frame, said dump body being supported in stable equilibrium on said fulcrums during normal transport, downfolding side doors for said dump body, and door controlling devices to hold said doors closed during normal transport and operating automatically, independently and selectively to permit one of said doors to open during the tilting for dumping of said body about the fulcrum adjacent said door, said devices including members directly engaging with the doors to hold them closed during normal transport and during tilting toward the side opposite the respective door, and links pivotally connected to said members and said doors to exert a positive opening effort upon the respective door during tilting about the adjacent fulcrum and for positively closing the door during return from tilted position.

5. In a dump vehicle, a frame, a dump body tiltable on said frame for dumping to either side, side doors for said dump body, transverse bars extending across said frame, links to pivotally connect said bars alternately to opposite sides of said frame, said bars being pivotally connected to said body adjacent the free ends, cooperating cams on the respective doors and on the portions of said bars beyond said respective connections to the body, and link connections between said bars and said doors.

6. In a dump vehicle, a frame, a dump body tiltable to either side for dumping about fulcrums at opposite sides of the frame and having a door at each side thereof, said body being supported in stable equilibrium upon said fulcrums during normal transport, and having a limited lateral movement during tilting, transverse bars extending across said frame, links to pivotally connect said bars alternately to opposite sides of said frame, to permit a relative movement of the respective bar with respect to said frame during a tilting of said body, said bars and said doors having respective cooperating means to lock said doors closed during transport, and means independent of said locking means and connecting said bars and doors to close an opened door during the return of the dump body from tilted position.

7. In a dump vehicle, a frame, a dump body tiltable for dumping at opposite sides of said frame, side doors for said body, cams connected to said side doors, cooperating cams pivotally connected to said frame and body to cooperate with said first cams to hold the doors closed during transport and during tilting toward the side opposite the respective door, and link connections pivoted to said doors and to said cooperating cams to close an opened door during the return of the body from tilted position.

8. In a dump vehicle, a frame, a dump body tiltable for dumping about fulcrums at opposite sides of said frame, said dump body being supported in stable equilibrium on said fulcrums during normal transport, side doors for said dump body adapted to fold down for dumping, and a controlling mechanism for each door including a respective rockable member, said rockable members being pivoted to the body, a respective link connecting each rockable member to its respective door, and a second respective link connecting a rockable member to the frame, said connection to the frame being located substantially at the fulcrum on the side opposite the respective door.

9. In a dump vehicle, a frame, a dump body tiltable for dumping about fulcrums at opposite sides of said frame, said dump body being supported in stable equilibrium on said fulcrums during normal transport, side doors for said dump body adapted to fold down for dumping, and a controlling mechanism for each door including a rockable member pivoted to the body, a link pivotally connected to the rockable member and to the respective door, a second link pivotally connected to said rockable member and to the frame, said second link being located substantially vertically when the dump body is in the transport position and being connected to the frame adjacent the fulcrum at the side opposite the door controlled by the respective controlling mechanism.

10. In a dump vehicle, a frame, a dump body rockable selectively about fulcrums at opposite sides of said frame for dumping to the respective sides of the vehicle, side doors pivoted to said body, and a controlling mechanism for each door including a rockable member pivoted to the body, and link connections between said rockable member and the respective door and between the rockable member and the frame at the side opposite the respective door.

11. In a dump vehicle, a frame, a dump body tiltable to either side for dumping about respective fulcrums at opposite sides of the frame, said body being supported in stable equilibrium upon said fulcrums during normal transport, side doors pivoted to said body at the sides thereof, a door controlling member for each door connected to and movable with said body during tilting toward the side opposite the respective door, a link pivotally connected to said member and the respective door to control the movement of the door during tilting toward the side adjacent said respective door, and a respective second link pivotally connected to each said respective member and to said frame, the connection to said frame being adjacent the fulcrum at the side opposite the respective door.

12. In a dump vehicle, a frame, a dump body tiltable to either side for dumping about fulcrums at opposite sides of the frame, said body being supported in stable equilibrium upon said fulcrums during normal transport, side doors pivoted to said body at the sides thereof to fold down for dumping, and an independent door controlling device for each door including a rockable member pivoted to said body, a link connected to said member and to the frame substantially at the fulcrum opposite the respective door, and another link connected to said door and cooperating with said member to control the door for opening and closing movement during the tilting and returning of the body.

In testimony whereof, I affix my signature.
HENRY FORT FLOWERS.